United States Patent Office 3,642,952
Patented Feb. 15, 1972

3,642,952
REACTION PRODUCT OF A VINYL ESTER
AND POLYPROPYLENE
Victor Jasinski, Dover, and Raymond A. Stone, Fairfield
Farms, Del., assignors to Standard Brands Chemical
Industries, Inc., Dover, Del.
No Drawing. Filed June 2, 1969, Ser. No. 829,765
Int. Cl. C08f 15/00
U.S. Cl. 260—878 R                   7 Claims

ABSTRACT OF THE DISCLOSURE

A process for producing polymeric thermoplastic compositions which comprises effecting reaction of a mixture containing a low molecular weight polyolefin homopolymer, e.g., atactic polypropylene, and a copolymerizable vinyl ester, e.g., vinyl acetate, in a solvent which is a mutual solvent for the homopolymer and for the copolymerizable vinyl ester, e.g., toluene, in the presence of a free radical polymerization catalyst until a major proportion of the vinyl ester has reacted, thereafter removing the solvent, and then continuing the polymerization reaction at an elevated temperature below the thermal degradation temperature of the homopolymer to produce a homogeneous reaction product.

This invention relates to the production of unique thermoplastic compositions especialy useful as hot melt adhesives, and more particularly to a novel process for producing unique thermoplastic polymeric compositions by effecting reaction of a low molecular weight polyolefin homopolymer with a copolymerizable vinyl ester, and the polymeric compositions obtained thereby.

Polymeric products from the reaction of olefinic homopolymers, such as polyethylene, and copolymerizable vinyl monomers, including vinyl esters, are known and have been prepared by various polymerization processes. These reaction products of the polyethylene and the vinyl monomer are often designated as graft copolymers, this terminology being used since it is believed that the copolymerizable monomer grafts onto or attaches to the backbone of the olefinic homopolymer in the form of polymeric side chains or branches. In preparing certain graft copolymers, many surface treating processes or techniques have been employed to activate the surface of the olefinic homopolymer or base polymer and to facilitate grafting of the monomeric materials. Examples of these techniques include subjecting the base polymer to irradiation, peroxidation by exposure to the oxygen-containing atmospheres at elevated temperatures, oxidation by contact with nitrogen dioxide, fuming nitric acid or the like, and subsequently reacting the activated polymer with the polymerizable vinyl monomer so that the monomer is grafted or polymerized onto the base polymer.

Also, mixtures of the base polymer and the copolymerizable vinyl monomer have been copolymerized with catalysts in bulk or solution or dispersion reaction media.

These attempts to modify the polymeric backbone of the base polymer have met with varying degrees of success and it is generally recognized that many of the known graft polymerization techniques are suitable only for small scale laboratory reaction schemes, and are not suitable in pilot plant scale-up or economical commercial production.

For example, the surface-treating processes for grafting, especially by irradiation, are very costly and often restricted to the use of base polymers in the form of thin films, sheets, threads or filaments, or finely divided powders. Moreover, one of the drawbacks universally experienced by the catalytic bulk, solution or dispersion processes is that the resulting reaction product usually comprises a mixture of a homopolymer of the polymerized vinyl monomer, a graft copolymer of the olefinic homopolymer and the polymerizable vinyl monomer, and unreacted portions of the olefinic homopolymer and the polymerizable vinyl monomer. Many of the components of this reaction product are not compatible with each other, thereby necessitating their removal in order to provide a useful graft polymerization product. The separation techniques required for effecting removal of one or more of the components include solvent extraction, solvent distillation, solvent precipitation, crystallization and the like. These separation techniques are expensive, costly and time-consuming. Consequently, many of the polymeric products heretofore described, particularly in the patent literature, are not commercially available.

Advantageously, this invention provides a catalytic solvent process that produces a reaction product of a low molecular weight polyolefin homopolymer and a copolymerizable vinyl ester which can directly be used in many thermoplastic applications, especially as a hot melt adhesive, without requiring and additional treatment after the graft polymerization reaction. Moreover, the reaction product obtained by this process exhibits unique properties particularly suitable for hot melt adhesives, especially toughness and workable molten viscosities.

This invention contemplates a process for producing polymeric thermosplastic compositions, which comprises (1) effecting reaction of a mixture containing a polyethylene or polypropylene homopolymer of a low molecular weight and a copolymerizable vinyl ester in a solvent which is a mutual solvent for the homopolymer and for the copolymerizable vinyl ester at a temperature at which solvent reflux is obtained in the presence of a free radical polymerization catalyst; thereafter (2) removing substantially all of the solvent by heating the reaction mixture to a temperature above the boiling point of the solvent; and (3) continuing the reaction of the mixture by heating to an elevated temperature above the boiling point of the solvent to produce a homogeneous reaction product comprising a graft copolymer of the homopolymer and the copolymerizable vinyl ester. This product is sufficiently free from incompatible homopolymers of the copolymerizable vinyl ester and the unreacted homopolymer that the reaction product, upon standing in the molten condition, will not separate into different layers.

More specifically, this invention is directed to a process for producing a polymeric hot melt adhesive composition in which a low molecular weight solid, particulate homopolymer (preferably atactic, amorphous polypropylene) and a vinyl ester (preferably vinyl acetate) are mixed in certain weight proportions with an aromatic mutual solvent and heated until refluxing is obtained at a temperature below the boiling point of the solvent. Refluxing is continued until a uniform dispersion of the reactants is obtained. A catalytic solution comprising a free radical polymerization initiator and additional mutual solvent is added to the refluxing mixture to initiate reaction therein. The resulting catalyst- and solvent-containing mixture is kept at the reflux temperature until the reflux temperature nears the boiling point of the solvent, which indicates substantial polymerization of the vinyl ester. The reaction mass is then heated to a temperature above the boiling point of the mutual solvent to effect substantially complete removal of the solvent. The resulting solvent-free reaction mass is thereafter heated at temperatures below the degradation temperature of the homopolymer, i.e., from about 130° to 220° C., to produce a completely homogeneous reaction product. The reaction product exhibits chemical and physical properties superior not only to the original homopolymer reactant, but also to blends of the homopolymer with the vinyl ester and/or homopolymers of the vinyl ester.

The invention is also concerned with the unique thermoplastic polymeric compositions or reaction products produced by the above processes. These compositions are characterized by melting points from about 50° to 140° C., and many exhibit a 100% or greater increase in toughness over the initially charged homopolymer, and a viscosity in a molten condition no greater than about 50,000 centipoises. This latter property is necessary to facilitate the polymerization reaction during the last polymerization stage of the process, i.e., during bulk polymerization without solvent. Moreover, as heretofore described, the reaction products of the low molecular weight homopolymer of polypropylene and a vinyl ester, such as vinyl acetate, are free of incompatible components as evidenced by their ability to be maintained as homogeneous mass in the molten condition, i.e., without separating into two or more layers. These products are true thermoplastic materials in that they can be heated to a molten condition and allowed to solidify repeatedly without setting up or effecting self cross-linking.

It is believed that the products of this invention are graft copolymers in which the homopolymer backbone contains randomly distributed pendant vinyl ester groups as well as the polyvinyl ester chains or branches.

Polymeric materials suitable as the base polymers for the subject invention must be low molecular weight homopolymers, i.e., they have molecular weight of from about 500 to about 40,000 and preferably should have a melting range of from 30° C. to 100° C. in order to be suitable for the preparation of the hot melt compositions of this invention. The most useful polymers are polypropylenes, particularly low molecular weight isotactic or atactic polypropylene. Atactic or amorphous polypropylene is preferred because of its low cost, and availability, and particularly because it has exceptional heat adhesive properties.

It will be appreciated that these low molecular polymers, even atactic polypropylene, are not alone suitable as hot melt adhesives. For example, they have properties such as low tensile strength, i.e., 200 p.s.i., and long setting times during which their adhesive properties (upon being cooled down from a molten condition) do not provide adequate bond for paper, cardboard, metal and the like surfaces. These disadvantages are overcome by the composition of the subject invention.

The vinyl esters suitable for preparation of the polymeric compositions, particularly the hot melt adhesives, are the esters of vinyl alcohol and a saturated monocarboxylic acid containing from 2 to 4 carbon atoms. These vinyl esters include vinyl acetate, vinyl propionate and vinyl butyrate. Vinyl acetate is the preferred monomer because of its ease of polymerization, availability and its ability to substantially improve the hot melt characteristics of the resulting reaction product.

The solvents employed in the process of this invention are non-polar cyclic hydrocarbons, preferably aromatic, which are mutual solvents for the olefinic polymers and for the vinyl esters. In this regard, it will be understood that the term "mutual solvent" refers to those solvents in which the vinyl esters are completely soluble and in which the olefinic polymers are at least partially soluble and/or swellable.

In addition, in order to facilitate their removal from the reaction mass or mixture, the solvents must have an atmospheric boiling point below about 150° C. Solvents which meet these requirements include benzene, toluene, the xylenes, ethyl benzene and cyclohexane.

The relative amounts of olefinic homopolymer and copolymerizable vinyl ester used in preparing the reaction products of this invention can be varied over a relatively wide range. In general, the relative proportions of these reactants are determined not only by the efficiency of the polymerization reaction, but also by the properties desired in the reaction product for an intended application. For example, properties such as the tensile strength, elongation and setting-up time are particularly critical for hot melt adhesives and may be adjusted by the selection of process conditions.

Thus, it has been found that in order to prepare reaction products which have properties required for hot melt adhesives, the weight proportions of the base homopolymer to the vinyl ester monomer should be from about 9:1 to about 0.5:1. Lesser amounts of the monomer may be employed where less toughness and other improved properties are not necessary. Also, greater amounts of the homopolymer may be utilized when the properties attributable to the olefinic backbone, e.g., resistance to alkali, acids and the like, adhesiveness, low water adsorption etc., are of lesser importance. However, because substantially homogeneous reaction products can not consistently be obtained when the relative proportion by weight of the monomeric material is substantially greater than that of the homopolymer, the weight proportion or ratio of homopolymer to monomer in the change should not be less than about 0.3:1.

It will also be appreciated that the mutual solvent must be used in amounts sufficient to dissolve all of the vinyl ester and to partially dissolve or swell the homopolymer sufficiently to form a stirrable reaction mixture. Usually from about 10 to about 100 parts by weight of the solvent per 100 parts of the combined weights of homopolymer and monomer charged are used. However, the relative amounts of reactants will vary somewhat depending on the activity of each reactant, particularly the homopolymer. Thus, in some cases, greater or lesser amounts of one of the reactants may be required to achieve the desired improvement in the properties of the reaction product as compared to the base homopolymer.

When atactic polypropylene is reacted with vinyl acetate, it has been found that the preferred weight ratio of polypropylene to vinyl acetate is in the range of from about 6:1 to about 1:1.

The catalysts employed to initiate graft polymerization of the olefinic base homopolymer and the vinyl ester monomer are oil-soluble, free radical type initiators that must be capable of initiating the polymerization reaction at temperatures of from 60° to 120° C. Such catalysts include the organic peroxides such as 2,4-dichlorobenzoyl peroxide, lauroyl, peroxide, caprylyl peroxide, acetyl peroxide, benzoyl peroxide, p-chlorobenzoyl peroxide, t-butyl peroxy isobutyrate, hydroxy heptyl peroxide and cyclohexanone peroxide and the aliphatic azo-containing compounds such as azobisisobutyronitrile and the like. Generally, from about 0.1 to about 2.0 parts of the catalyst per 100 parts of the vinyl ester are used.

The polymerization process of the invention, as described briefly above, comprises a number of sequential stages. These are described in detail below in the context of a charged polymerization mixture of low molecular weight atactic polypropylene, vinyl acetate and toluene:

In the mixing stage the atactic polypropylene and vinyl acetate are charged into a reactor with the mutual solvent, i.e., toluene, in weight proportions varying from about 6:1 to 0.5:1 (polyproylene to vinyl acetate). The reactor is equipped with a thermometer or other means for measuring the temperature of its contents, a water-cooled condensing system, a distilling receiver, and a stirrer or other means for effecting agitation and mixing of the solvent and reactants. The charge is initially heated and agitated until refluxing of the volatile components occurs at a reflux temperature below the boiling point of the toluene. In this case a temperature of about 85° C. is used.

The contents of the reactor are held at the reflux temperature until a portion of the polypropylene is dissolved or swollen sufficiently to produce a mixture having a stirrable consistency with the undissolved (or swollen) particles of the polypropylene uniformly dispersed throughout the liquid portion of the mixture.

The solvent-polymerization stage of the process is initiated by the addition of a polymerization catalyst to the reaction mixture, which is maintained at a temperature such that continuous solvent reflux is obtained. The refluxing temperature usually varies from about 70° C. to about 100° C. depending on the respective boiling points of the vinyl monomer and the solvent. The catalyst may be added alone or it may be added in the form of a solution in the mutual solvent.

Upon addition of the catalyst, the temperature and/or pressure of the reaction system is adjusted to maintain continuous solvent reflux. As the vinyl ester monomer is polymerized, the reflux becomes richer in solvent and poorer in vinyl monomer. Thus, the temperature at which continuous solvent reflux can be maintained approaches the boiling point of the neat solvent. Complete reaction of the vinyl monomer is indicated when the temperature at which continuous solvent reflux is maintained is equal to the boiling point of the solvent alone. Thus, in the case of a solvent lower boiling than the vinyl ester monomer, the temperature of the reaction system becomes lower as the monomer is consumed. In the case of a solvent higher boiling than the vinyl ester monomer, the temperature of the reaction system becomes higher as the reaction proceeds. In the case of vinyl acetate as the vinyl ester monomer and toluene as the mutual solvent, the temperature increases from about 85° C. at the beginning of the solvent polymerization stage to about 105° C. when most of the vinyl acetate has been reacted.

In the following solvent-removal stage, the mutual solvent is removed from the reactor by heating the reaction mixture above the boiling point of the solvent to distill off the solvent through the distilling receiver. After substantially all of the solvent has been removed, the final stage of the process begins.

In this final stage, which can be considered the bulk polymerization stage, the reactor and its contents are maintained at elevated temperatures, e.g., from about 130° C. to 220° C. and preferably from about 140° C. to 185° C. Such temperatures are substantially above those used in the solvent polymerization stage but below the degradation temperature of the homopolymer. The reaction mixture is maintained at this temperature until a molten, homogeneous, clear reaction product is obtained.

The time to obtain homogeneity may be as little as 15–20 minutes or as long as six hours, depending up many variables such as heating rate, temperature, relative crystallinity of the polypropylene, composition and amount of the vinyl monomer etc. Homogeneity is nevertheless easily determined by observing the clarity of the molten system or by forming and rapidly cooling a thin film sampled from the molten reaction mixture. This product, as heretofore described, is especially useful as a hot melt adhesive, when taken directly from the reactor in its molten condition.

In accordance with this invention, it has been found that the temperatures used during the different stages of the process for preparing the unique reaction products are important and that these temperatures should be controlled in a predetermined manner to obtain the desired homogeneous reaction products. Thus, it will be understood that prior to removal of the solvent, the temperature in the reactor must be kept at reflux conditions, i.e., below the boiling point of the monomer-solvent mixture, until the polypropylene has partially dissolved or swollen to form a stirrable mixture with the vinyl ester.

Upon addition of the catalyst to the reaction mixture, which initiates the solvent polymerization stage, the temperature of the reaction system is adjusted (by either heating or cooling, depending upon the heat loss characteristics of the system) to maintain continuous solvent reflux. When the solvent polymerization has proceeded to the desired degree of completion, which is indicated by solvent reflux temperatures of within 5–10° C. of the boiling point of the solvent, the reaction temperature is adjusted as necessary to a temperature above the boiling point of the solvent or the mixture of solvent and unreacted vinyl monomer to effect removal of essentially all the solvent and, in some instances, unreacted vinyl monomer. In the case of toluene this temperature is 110° C. at 1 atm.

After the solvent has been removed, the reaction temperature is maintained at a temperature range of from about 130° C. to 220° C. Preferably the temperature is maintained at a range of from 140° C. to 185° C. in order to reduce the reaction time required and also to keep the reaction mass substantially below the degradation temperature of the base polymer. (In the case of atactic polypropylene this is usually in the neighborhood of 220° C.)

It will also be recognized that the time required for each stage of the process, i.e., the mixing and refluxing stage, the solvent polymerization stage, the solvent-removal stage, and the final bulk polymerization stage, is determined by the temperature and reactants employed. In the case of the preparation of hot melt adhesives from atactic polypropylene and vinyl acetate it has been found that the reflux stage will usually take from 1 to 2 hours; whereas the solvent polymerization stage will extend from about 3 to 6 hours. Removal of the solvent usually is effected within less than 1 hour and reaction time subsequent to solvent removal may extend from ½ to 6 hours, preferably from 1 to 3 hours.

It will be understood that the pressures within the reactor during each stage are autogenous pressures and that these may extend from atmospheric to super-atmospheric pressures on the order of 5–50 p.s.i.

It will also be appreciated that the reaction products of this invention can be utilized in many different applications where thermoplastic polymeric compositions are used, e.g., films, sheets, coatings, and the like and that in view of their unique combination of tensile strength, adhesiveness, and adhesive setting time, the preferred applications is in hot melt adhesive compositions for sealing, laminating and bonding of paper products, metals, plastics and the like.

The following examples serve to illustrate the invention, but are not intended to limit the scope thereof:

EXAMPLE I

This example illustrates the preparation of the novel reaction products of this invention.

A reaction vessel equipped with a thermometer, stirrer, additional funnel, a water-cooled condenser and a distilling receiver generally known as a Dean Stark tube was charged with 425 parts of atactic polypropylene crumbs, 75 parts of toluene and 75 parts of vinyl acetate (all parts being by weight). These ingredients were heated and agitated until reflux was obtained at 85° C.

Approximately one hour after reflux was initiated, it was observed that the polypropylene had partially dissolved and swollen and that it was uniformly dispersed within a liquid phase. At this time, the reaction mass was cloudy and would separate into two layers when stirring was discontinued. After stirring had been reinitiated, a catalyst solution previously prepared and consisting of 1.5 parts of benzoyl peroxide and 10 parts of toluene was added slowly through the addition funnel to start the reaction.

The catalyzed reaction mass was kept at reflux conditions of temperature (initially about 85° C.) for approximately 5 hours, by which time the reflux temperature had increased to 105° C., thus indicating that essentially complete polymerization of the vinyl acetate monomer had occurred. The resulting lacquer at this point was observed to be cloudy and would form two separate layers if stirring was discontinued, thus indicating a heterogeneous mixture of polymeric reaction products and unreacted polymer and monomer.

The solvent-containing reaction mass was then heated further to a temperature of between 105° C. and 125° C. and the toluene solvent was removed by allowing it to distill and collect in the Dean Stark tube. The tube was drained so that collected solvent would not return to the vessel. (Analysis of the solvent removed shows that it consisted of 95% toluene.) The polymeric substantially solvent-free charge was further heated until the temperature reached 180° C. The charge was kept at this temperature for approximately 2 hours and then discharged from the reaction vessel while in a molten condition. It was observed that the resulting reaction product (480 parts) was slightly yellow and completely homogeneous (i.e., the reaction product would not separate into layers while in a molten liquid condition).

EXAMPLE II

This example further illustrates preparation of additional number of graft copolymers using the procedure described in Example I. As noted below, the proportions of the charged ingredients used to prepare the graft reaction products in this series of runs were varied considerably from that used in Example I.

TABLE 1

| | Parts by weight | | | | Max. temp. (° C.) | Time at max. temp. (hrs.) |
|---|---|---|---|---|---|---|
| Run Number | Atactic polypropylene | Vinyl acetate | Toluene | Benzoyl peroxide | | |
| 2 | 90 | 10 | 20 | 0.21 | 140 | 4 |
| 3 | 80 | 20 | 22 | 0.44 | 145 | 3 |
| 4 | 75 | 25 | 35 | 0.58 | 185 | 1.5 |
| 5 | 66 | 34 | 38 | 0.65 | 150 | 2 |
| 6 | 50 | 50 | 41 | 0.50 | 170 | 1.5 |
| 7 | 34 | 66 | 48 | 0.60 | 195 | 1 |

The reaction products obtained from the above runs were homogeneous and did not separate upon standing in the molten condition.

EXAMPLE III

In order to disclose further the importance of the steps of removing the solvent and of continuing the polymerization in bulk after solvent removal, additional products were prepared by using the charge ingredients used in Example I, i.e., 425 parts of atactic polypropylene, 75 parts of toluene and 75 parts of vinyl acetate, and a charge consisting of 100 parts of atactic polypropylene, 200 parts of vinyl acetate and 500 parts of toluene. These charges were heated and agitated until reflux was obtained at approximately 85° C. In each case after about 1–2 hours the polypropylene was partially dissolved or swollen to provide a uniform dispersion. To the dispersions was then added 1.5 and 10 parts of benzoyl peroxide catalyst respectively. The charge was maintained at solvent reflux conditions for a period of 2 hours, at which time the reaction temperature was 105° C. At this time each reactor was stripped of volatiles and the reaction products remaining in each reactor were discharged. The reaction products separated into layers indicating a heterogeneous mixture of the two polymers.

EXAMPLE IV

A series of graft copolymers were prepared by the procedures of Examples I and II in which the proportions of vinyl acetate were varied from 10 to 50% by weight. Each of these polymers, which were found to be homogeneous, was then examined as to its strength properties—tensile, elongation and toughness—and compared to the original polypropylene homopolymer.

Both maximum tensile strength and elongation were determined in accordance with ASTM Designation D 412–64T. In this procedure, standard size dumbbell specimens, of the material to be tested were prepared by compression molding and were subjected to the controlled application of a tensile load and the amount of tensile force and degree of elongation observed. The toughness of the polymer, being a function of both tensile strength and elongation, is determined by measurement of the relative area under the curve produced by plotting tensile strength v. elongation. The results were as follows:

TABLE 2.—EFFECT OF RELATIVE AMOUNT OF VINYL MONOMER ON STRENGTH PROPERTIES

| | Percent by weight | | Viscosity [1] at 150° C. (cps.) | Maximum | | Toughness factor |
|---|---|---|---|---|---|---|
| Run Number | Atactic polypropylene | Vinyl acetate | | Tensile strength (p.s.i.) | Elongation (percent) | |
|  | 100 | | 15,400 | 230 | 60 | 6,900 |
| 8 | 85 | 15 | 10,500 | 200 | 140 | 14,400 |
| 9 | 80 | 20 | 12,600 | 207 | 144 | 14,900 |
| 10 | 75 | 25 | 13,200 | 196 | 160 | 15,700 |
| 11 | 67 | 33 | 22,000 | 331 | 80 | 13,200 |
| 12 | 50 | 50 | 43,000 | 305 | 33 | 5,400 |

[1] Brookfield viscosimeter, No. 6 Spindle, 20 r.p.m.

These data show that below about 7% wt. vinyl acetate the tensile and elongation properties of the polymer approach those of neat polypropylene. Above about 45% wt. vinyl acetate, the polymer tensile and elongation properties approach those of polyvinylacetate, which has very high tensile strength but low elongation. However, it was quite unexpected to find that within the range of 7–45% vinyl acetate, the polymers of the invention possessed a toughness which far exceeded that of either polypropylene or polyvinylacetate. This property is, of course, extremely important in the use of the polymers as hot melt adhesives. Maximum toughness was obtained at 10–40% wt. vinyl monomer, which range is therefore preferred. Suitable melt viscosities were obtained up to 50% wt. vinyl monomer and throughout the preferred range of 10–40% wt. vinyl monomer.

EXAMPLE V

A graft copolymer was prepared in accordance with the procedure of Example I in which azobisisobutyronitrile was substituted as catalyst in place of benzoyl peroxide. The resulting homogeneous product, which contained 75 parts of polypropylene and 25 parts of vinylacetate, had a maximum tensile strength of 201 p.s.i., maximum elongation of 153% and a toughness factor of 15,400. This product is quite similar to that obtained in Run No. 10 (see Table 2 supra) and illustrates that the type of free radical initiator is not critical within the reaction conditions of the process.

EXAMPLE VI

A further series of graft copolymers is prepared using the procedure of Example I except that higher molecular weight vinyl monomers are used with a concomitant change in the conditions required to maintain reflux conditions during the solvent polymerization stage.

TABLE 3.—EFFECT OF HIGHER MOLECULAR WEIGHT VINYL MONOMER ON SOLVENT REFLUX CONDITIONS WITH TOLUENE

| | | | Solvent reflux temperature (° C.) | |
|---|---|---|---|---|
| Run Number | Vinyl monomer | Vinyl monomer B.P. (° C.) | Initial | Final |
| 8 | Vinyl acetate | 72 | 85 | 110 |
| 13 | Vinyl propionate | 95 | 98 | 110 |
| 14 | Vinyl butyrate | 117 | 113 | 110 |

In Runs 8 and 13, the temperature necessary to maintain solvent reflux becomes higher as the total reflux becomes poorer in monomer. However, in Run 14 the temperature necessary to maintain reflux of the solvent becomes lower as the total reflux becomes poorer in monomer content.

In all three runs, the polymeric product obtained upon completion of solvent removal is homogenous and has a viscosity under 50,000 cps. at 150° C.

EXAMPLE VII

A still further series of polymerizations is made according to the procedure of Example I except that a lower and higher boiling solvent are used. This, of course, necessitated a substantial change in the conditions necessary to maintain reflux conditions during the solvent polymerization stage.

TABLE 4.—USE OF LOWER AND HIGHER BOILING SOLVENTS

| Run number | Solvent | Solvent B.P. (° C.) | Solvent reflux temperature (° C.) | |
|---|---|---|---|---|
| | | | Initial | Final |
| 15 | Benzene | 80 | 74 | 80 |
| 16 | Cyclohexane | 81 | 74 | 81 |
| 8 | Toluene | 110 | 85 | 110 |
| 17 | Xylene | 139 | 95 | 139 |

The products from Runs 15–17 are essentially the same as that obtained in Run 8 which, in turn, is the same as Example I. Because of the rather high heat loss characteristics of the laboratory scale reaction system used, it is necessary to heat the reaction system throughout in order to maintain solvent reflux as the total reflux becomes poorer in vinyl monomer.

What is claimed is:

1. A process for producing polymeric thermoplastic compositions which comprises (1) effecting reaction of a mixture containing a polypropylene homopolymer that has a molecular weight of from about 500 to about 40,000 and a copolymerizable vinyl ester of a saturated $C_{2-4}$ alkyl monocarboxylic acid in a solvent which is a mutual solvent for the homopolymer and for the copolymerizable vinyl ester at a refluxing temperature to maintain continuous solvent reflux and in the presence of a free radical polymerization catalyst until a major proportion of the vinyl ester has reacted, the weight proportion of the homopolymer to vinyl ester being not less than about 0.3:1, and said solvent consisting essentially of non-polar cyclic hydrocarbon having a boiling point lower than about 150° C. (2) thereafter heating the mixture above the boiling point of the solvent to distill off and to remove substantially all of the solvent and (3) continuing the reaction of the reaction mixture by heating to an elevated temperature above the refluxing temperature and below the thermal degradation temperature of the homopolymer to produce a homogeneous reaction product consisting essentially of a graft copolymer of the homopolymer and the copolymerizable vinyl ester, said product having a melting point ranging from about 50° C. to about 140° C., a viscosity in the molten condition no greater than about 50,000 centipoises and such homogeneity that the product in the molten condition does not separate into layers.

2. The process of claim 1 in which the vinyl ester is vinyl acetate.

3. The process of claim 1 in which the free radical polymerization catalyst is selected from the group consisting of organic peroxides and aliphatic azo-containing compounds capable of initiating addition polymerization at temperatures from 60° to 120° C.

4. The process of claim 1 in which the homopolymer and the copolymerizable vinyl ester are mixed in the solvent by agitation and reflux of the solvent-containing reaction mixture is established prior to effecting reaction in the presence of the free radical polymerization catalyst.

5. The process of claim 4 in which the reaction of the homopolymer and vinyl ester in the solvent-containing reaction mixture is continued until the temperature at which solvent reflux is maintained is just below the boiling point of the solvent.

6. The process of claim 1 in which the homopolymer is atactic polypropylene, the vinyl ester is vinyl acetate and the solvent is toluene, the reaction is conducted in the presence of the solvent and free radical polymerization catalyst at a temperature from about 85° to about 105° C., and the polymerization is conducted in the absence of the solvent at temperatures from about 140° to about 220° C.

7. The process of claim 1 in which the weight proportion of the homopolymer to vinyl ester is from about 9:1 to about 0.5:1.

References Cited

Encyc. of Polymer Tech. (1965), pp. 494, 495, 525.

Chemical Grafting, Potts et al., Sept. 13, 1957, Bakelite Co.

JOSEPH L. SCHOFER, Primary Examiner

S. M. LEVIN, Assistant Examiner

U.S. Cl. X.R.

117—132 C, 138.8 A, 155 UA; 161—216, 247, 250; 260—93.7, 94.9 R